(12) United States Patent
Ström et al.

(10) Patent No.: US 9,769,495 B2
(45) Date of Patent: *Sep. 19, 2017

(54) ENCODING AND DECODING VIDEO SEQUENCES COMPRISING REFERENCE PICTURE SETS

(71) Applicant: Telefonaktiebolaget LM Ericsson (publ), Stockholm (SE)

(72) Inventors: Jacob Ström, Stockholm (SE); Jonatan Samuelsson, Stockholm (SE); Rickard Sjöberg, Stockholm (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/220,512

(22) Filed: Jul. 27, 2016

(65) Prior Publication Data

US 2016/0337663 A1    Nov. 17, 2016

Related U.S. Application Data

(63) Continuation of application No. 14/000,506, filed as application No. PCT/SE2013/050835 on Jul. 1, 2013, now Pat. No. 9,438,900.

(Continued)

(51) Int. Cl.
*H04N 19/58* (2014.01)
*H04N 19/105* (2014.01)
(Continued)

(52) U.S. Cl.
CPC ......... *H04N 19/58* (2014.11); *H04N 19/105* (2014.11); *H04N 19/136* (2014.11);
(Continued)

(58) Field of Classification Search
CPC .. H04N 19/176; H04N 19/593; H04N 19/172; H04N 19/182; H04N 19/105; H04N 19/136; A23K 10/30
See application file for complete search history.

(56) References Cited

U.S. PATENT DOCUMENTS 9,438,900 B2 *   9/2016  Strom ................. H04N 19/105
2007/0030899 A1  2/2007  Iguchi et al.
(Continued)

FOREIGN PATENT DOCUMENTS

RU       2310290 C2      11/2007
WO    WO 2013/157814 A1  10/2013
WO    WO 2014/002899 A1   1/2014

OTHER PUBLICATIONS

International Search Report, PCT Application No. PCT/SE2013/050835, Nov. 11, 2013.
(Continued)

*Primary Examiner* — Behrooz Senfi
(74) *Attorney, Agent, or Firm* — Sage Patent Group (57) ABSTRACT

A method of encoding a video sequence comprising Reference Picture Sets (RPSs) is provided. The method comprises arranging the RPSs in transmission order in a data structure, such as a Sequence Parameter Set (SPS), determining whether explicit RPS transmission is used for an RPS of a current picture of the video sequence, and encoding information indicating an RPS comprised in the data structure to be used for predicting the RPS of the current picture, such as delta_idx_minus1, only if explicit RPS transmission is used. By transmitting delta_idx_minus1 only if explicit RPS transmission is used, and interpreting delta_idx_minus1 to be equal to zero otherwise, a reduced bitrate is achieved. Further, a method of decoding a video sequence comprising RPSs, corresponding computer programs and computer pro- (Continued)

gram products, as well as corresponding encoders and decoders are provided.

18 Claims, 6 Drawing Sheets

Related U.S. Application Data (60) Provisional application No. 61/666,235, filed on Jun. 29, 2012.

(51) Int. Cl.

| | |
|---|---|
| *H04N 19/176* | (2014.01) |
| *H04N 19/70* | (2014.01) |
| *H04N 19/463* | (2014.01) |
| *H04N 19/136* | (2014.01) |
| *H04N 19/174* | (2014.01) |
| *H04N 19/139* | (2014.01) |
| H04N 19/52 | (2014.01) |

(52) U.S. Cl.
CPC ......... *H04N 19/139* (2014.11); *H04N 19/174* (2014.11); *H04N 19/176* (2014.11); *H04N 19/463* (2014.11); *H04N 19/70* (2014.11)

(56) References Cited

U.S. PATENT DOCUMENTS

| | | | |
|---|---|---|---|
| 2009/0220012 A1 | 9/2009 | Rodriguez et al. | |
| 2010/0246680 A1 | 9/2010 | Tian et al. | |
| 2013/0188882 A1 | 7/2013 | Zhao et al. | |
| 2013/0194384 A1 | 8/2013 | Hannuksela | |
| 2013/0259393 A1* | 10/2013 | Deshpande | G06T 9/00 382/232 |
| 2013/0272398 A1 | 10/2013 | Deshpande | |
| 2013/0272403 A1 | 10/2013 | Ramasubramonian et al. | |
| 2013/0294500 A1* | 11/2013 | Wang | H04N 19/70 375/240.02 |
| 2015/0103882 A1 | 4/2015 | Kim et al. | |

OTHER PUBLICATIONS

Written Opinion of the International Searching Authority, PCT Application No. PCT/SE2013/050835, Nov. 11, 2013.
Japanese Notice of Ground for Rejection Corresponding to Japanese Patent Application No. 2015-520125; Mailing Date: Aug. 21, 2015; Translated pp. 3.
Bross et al. "High efficiency video coding (HEVC) text specification draft 7", Joint Collaborative Team on Video Coding (JCT-VC) of ITU-T SG16 WP3 and ISO/IEC JTC1/SC29ANG11, 9$^{th}$ Meeting: Geneva, CH, Apr. 27-May 7, 2012; 6 Pages.
Sjoberg et al.: "Absolute signaling of reference pictures", (Document JCTVC-F493), Joint Collaborative Team on Video Coding (JCT-VC) of ITU-T SG16 WP3 and ISO/IEC JTC1/SC29/WG11, 7$^{th}$ Meeting: Geneva, CH, Nov. 21-30, 2011, 10 pp.
Sjoberg: "JCT-VC AHG report: Reference picture buffering and list construction (AHG21)", (Document JCTVC-G021), Joint Collaborative Team on Video Coding (JCT-VC) of ITU-T SG16 WP3 and ISO/IEC JTC1/SC29/WG11, 7$^{th}$ Meeting: Geneva, CH, Nov. 21-30, 2011, 9 pp.
Zhao et al.: "Parameterized RPS Models", (Document JCTVC-H0551), Joint Collaborative Team on Video Coding (JCT-VC) of ITU-T SG16 WP3 and ISO/IEC JTC1/SC29/WG11, 8$^{th}$ Meeting: San Jose, CA, USA, Feb. 2012, 6 pp.
Hannuksela: "AHG21: Removal of reference picture list modification", (Document JCTVC-H0426), Joint Collaborative Team on Video Coding (JCT-VC) of ITU-T SG16 WP3 and ISO/IEC JTC1/SC29/WG11, 8$^{th}$ Meeting: San Jose, CA, USA, Feb. 1-10, 2012, 10 pp.
Zhao et al.: "Parameterized RPS Models", (Document JCTVC-I0388), Joint Collaborative Team on Video Coding (JCT-VC) of ITU-T SG16 WP3 and ISO/IEC JTC1/SC29/WG11, 9$^{th}$ Meeting: Geneva, CH, Apr.-May 7, 2012, 6 pp.
Qui et al.; "Buffer requirement analysis and reference picture marking for temporal scalable video coding" Nov. 1, 2007, XP031170603, ISBN: 978-1-4244-0980-8; pp. 91-97.
Tan, "AHG21: Inter reference picture set prediction syntax and semantics" (Document JCTVC-G198r2), Joint Collaborative Team on Video Coding (JCT-VC) of ITU-T SG16 WP3 and ISO/IEC JTC1/SC29/WG11, 7$^{th}$ Meeting: Geneva, CH, Nov. 21-30, 2011, 10 pp.
Tan et al./NTT DOCOMO, Inc., "AHG21: Inter reference picture set prediction syntax and semantics", Status Input Document to JCT-VC, Purpose: Proposal, Document: JCTVC-G198r2, Joint Collaborative Team on Video Coding (JCT-VC) of ITU-T SG16 WP3 and ISO/IEC JTC1/SC29/WG11, 7$^{th}$ Meeting: Geneva, CH, Nov. 21-30, 2011, 10 pp.
Flynn et al. "JCT-VC AHG report: Reference picture buffering and list construction (AHG21)", Joint Collaborative Team on Video Coding (JCT-VC) of ITU-T SG16 WP3 and ISO/IEC JTC1/SC29/WG11, 7$^{th}$ Meeting: Geneva, CH, Nov. 21-30, 2011, Document: JCTVC-G021, published on Nov. 21, 2011, 9 pages.
Hannuksela et al. "AHG21: Removal of reference picture list modification", Joint Collaborative Team on Video Coding (JCT-VC) of ITU-T SG16 WP3 and ISO/IEC JTC1/SC29/WG11, 8$^{th}$ Meeting: San Jose, CA, USA, Feb. 1-10, 2012, Document: JCTVC-H0426, published on Mar. 2, 2012, 10 pages.
Russian Decision on Grant Corresponding to Russian Application No. 2015102756/08 (004280); Dated: Aug. 15, 2016; 6 Pages.

* cited by examiner

Fig. 1

| POC | RPS |
|---:|---|
| 0 | intra image - does not reference other images |
| 8 | -8 |
| 4 | -4, 4 |
| 2 | -2, 2, 6 |
| 6 | -2, -4, -6, 2 |
| 1 | -1, 1, 3, 5, 7 |
| 3 | -1, -3, 1, 3, 5 |
| 5 | -1, -5, 1, 3 |
| 7 | -1, -3, 1 |
| 16 | -8 |
| 12 | -4, 4 |
| 10 | -2, 2, 6 |
| 14 | -2, -4, -6, 2 |
| 9 | -1, 1, 3, 5, 7 |
| 11 | -1, -3, 1, 3, 5 |
| 13 | -1, -5, 1, 3 |
| 15 | -1, -3, 1 |
| 24 | -8 |

Fig. 2

| RPS index | RPS |
|---:|---|
| 0 | -8 |
| 1 | -4, 4 |
| 2 | -2, 2, 6 |
| 3 | -2, -4, -6, 2 |
| 4 | -1, 1, 3, 5, 7 |
| 5 | -1, -3, 1, 3, 5 |
| 6 | -1, -5, 1, 3 |
| 7 | -1, -3, 1 |

Fig. 3

| POC | RPS index |
|---|---|
| 0 | intra image - does not reference other images |
| 8 | 0 |
| 4 | 1 |
| 2 | 2 |
| 6 | 3 |
| 1 | 4 |
| 3 | 5 |
| 5 | 6 |
| 7 | 7 |
| 16 | 0 |
| 12 | 1 |
| 10 | 2 |
| 14 | 3 |
| 9 | 4 |
| 11 | 5 |
| 13 | 6 |
| 15 | 7 |
| 24 | 0 |

Fig.4
```
short_term_ref_pic_set( idx ) {
    inter_ref_pic_set_prediction_flag
    if( inter_ref_pic_set_prediction_flag ) {
        delta_idx_minus1
        delta_rps_sign
        abs_delta_rps_minus1
        for( j = 0; j <= NumDeltaPocs[ RIdx ]; j++ ) {
            used_by_curr_pic_flag[ j ]
            if( !used_by_curr_pic_flag[ j ] )
                use_delta_flag[ j ]
        }
    }
    else {
        num_negative_pics
        num_positive_pics
        for( i = 0; i < num_negative_pics; i++ ) {
            delta_poc_s0_minus1[ i ]
            used_by_curr_pic_s0_flag[ i ]
        }
        for( i = 0; i < num_positive_pics; i++ ) {
            delta_poc_s1_minus1[ i ]
            used_by_curr_pic_s1_flag[ i ]
        }
    }
}
```

Fig. 5

| Index | POC | RPS | GOP |
|---|---|---|---|
| 0 | 1 | -1 | 0 |
| 1 | 2 | -1 -2 | 0 |
| 2 | 3 | -1 -3 | 0 |
| 3 | 4 | -1 -4 | 0 |
| 4 | 5 | -1 -5 | 1 |
| 5 | 6 | -1 -2 -6 | 1 |
| 6 | 7 | -1 -3 -7 | 1 |
| 7 | 8 | -1 -4 -8 | 1 |
| 8 | 9 | -1 -5 -9 | 2 |
| 9 | 10 | -1 -2 -6 -10 | 2 |
| 10 | 11 | -1 -3 -7 -11 | 2 |
| 11 | 12 | -1 -4 -8 -12 | 2 |
| 12 | 13 | -1 -5 -9 -13 | 3 |
| 13 | 14 | -1 -2 -6 -10 | 3 |
| 14 | 15 | -1 -3 -7 -11 | 3 |
| 15 | 16 | -1 -4 -8 -12 | 3 |

Fig. 6

| index | POC | Reference | GOP |
|---|---|---|---|
| 0 | 13 | -1 -5 -9 -13 | 3 |
| 1 | 14 | -1 -2 -6 -10 | 3 |
| 2 | 15 | -1 -3 -7 -11 | 3 |
| 3 | 16 | -1 -4 -8 -12 | 3 |
| 4 | 1 | -1 | 0 |
| 5 | 2 | -1 -2 | 0 |
| 6 | 3 | -1 -3 | 0 |
| 7 | 4 | -1 -4 | 0 |
| 8 | 5 | -1 -5 | 1 |
| 9 | 6 | -1 -2 -6 | 1 |
| 10 | 7 | -1 -3 -7 | 1 |
| 11 | 8 | -1 -4 -8 | 1 |
| 12 | 9 | -1 -5 -9 | 2 |
| 13 | 10 | -1 -2 -6 -10 | 2 |
| 14 | 11 | -1 -3 -7 -11 | 2 |
| 15 | 12 | -1 -4 -8 -12 | 2 |

Fig. 7

| RPS index | POC | deltaPOC | RPS |
|---|---|---|---|
| 0 | 8 | -8 | -8 |
| 1 | 4 | 4 | -4, 4 |
| 2 | 2 | 3 | -2, 2, 6 |
| 3 | 6 | -4 | -2, -4, -6, 2 |
| 4 | 1 | 5 | -1, 1, 3, 5, 7 |
| 5 | 3 | -2 | -1, -3, 1, 3, 5 |
| 6 | 5 | -2 | -1, -5, 1, 3 |
| 7 | 7 | -2 | -1, -3, 1 |

Fig. 8

```
short_term_ref_pic_set( idx ) {
    inter_ref_pic_set_prediction_flag
    if( inter_ref_pic_set_prediction_flag ) {
        if( idx = = num_short_term_ref_pic_sets )
            delta_idx_minus1
        delta_rps_sign
        abs_delta_rps_minus1
        for( j = 0; j <= NumDeltaPocs[ RIdx ]; j++ ) {
            if(used_by_curr_present_in_inter_rps_flag ) {
                used_by_curr_pic_flag[ j ]
                if( !used_by_curr_pic_flag[ j ] )
                    use_delta_flag[ j ]
            }
            else
                use_delta_flag[ j ]
        }
    }
    else {
        num_negative_pics
        num_positive_pics
        for( i = 0; i < num_negative_pics; i++ ) {
            delta_poc_s0_minus1[ i ]
            used_by_curr_pic_s0_flag[ i ]
        }
        for( i = 0; i < num_positive_pics; i++ ) {
            delta_poc_s1_minus1[ i ]
            used_by_curr_pic_s1_flag[ i ]
        }
    }
}
```

ENCODING AND DECODING VIDEO SEQUENCES COMPRISING REFERENCE PICTURE SETS

CROSS REFERENCE TO RELATED APPLICATIONS

This application is a continuation of U.S. patent application Ser. No. 14/000,506, filed Aug. 20, 2013, which itself is a 35 U.S.C. §371 national stage application of PCT International Application No. PCT/SE2013/050835, filed on 1 Jul. 2013, which itself claims priority to U.S. Provisional Patent Application No. 61/666,235, filed 29 Jun. 2012, the disclosure and content of all of which are incorporated by reference herein in their entireties.

TECHNICAL FIELD

The invention relates to a method of encoding a video sequence comprising Reference Picture Sets (RPSs), a method of decoding a video sequence comprising RPSs, corresponding computer programs and computer program products, a corresponding encoder, and a corresponding decoder.

BACKGROUND

High Efficiency Video Coding (HEVC) is a new video coding standard currently being developed in the Joint Collaborative Team-Video Coding (JCT-VC). JCT-VC is a collaborative project between the Moving Picture Experts Group (MPEG) and the Telecommunication Standardization Sector of the International Telecommunication Union (ITU-T). Currently, a committee draft is defined that includes a number of new tools which makes HEVC considerably more efficient than prior art video coding standards, in particular H.264/AVC.

HEVC is a hybrid codec that uses multiple reference pictures for inter-prediction. It includes a picture marking process in which reference pictures can be marked as "used for short-term reference", "used for long-term reference", or "unused for reference". If marked "unused for reference", the reference picture is turned into a non-reference picture and cannot be used for inter-prediction any more. A picture marked "unused for reference" cannot be re-marked later to be used for short-term or long-term reference.

The marking process in HEVC is controlled by RPSs. An RPS is a set of picture identifiers which identify reference pictures. The RPS is sent in each slice, and reference pictures which are indicated in the RPS will be kept in the Decoder Picture Buffer (DPB) and marked as "used for short-term reference" or "used for long-term reference".

As an example, the RPS information may contain the values "−4, −6, 4". This means that the current picture can predict from, i.e., copy pixels from, the picture four frames back (in display order) since the figure −4 is present. It will also be able to predict from the picture six frames back and even from the picture four frames in the future. Thus, the decoder can discard all the images in its buffer except for the three described above. This is a robust way for the decoder to discard pictures. In practice, the decoder may have to keep these images until they are displayed, but they will not be used for inter-prediction again. For simplicity, in the remainder of this disclosure this situation will be considered as if the decoder can discard these images.

Sometimes the information comprised in an RPS can be rather lengthy. As an example, the following RPS is used for test purposes during HEVC standardization: "−3, −2, 1, 2, 5, 6". Encoding this example RPS may require up to 33 bits, which is a noticeable amount, in particular at very low bit rates and small image sizes.

One key observation is that the RPSs are typically not completely random. Rather, they can be reused over and over again. As an example, we consider a sequence of 18 images from a configuration file used for test purposes in HEVC standardization.

Pictures in HEVC are identified by their Picture Order Count (POC) values (PicOrderCntVal), also known as full POC values. These numbers represent the output order, also referred to as the display order, of the pictures. That is, a picture with POC=57 will be displayed directly after a picture with POC=56. However, the images are not always transmitted in the order they are displayed. For instance, the encoder may first transmit the picture with POC=0, followed by POC=8, followed by POC=4, and so forth. The decoder has to keep track of the pictures and display them in the correct order. In the example from HEVC standardization, the 18 pictures will be transmitted in the order indicated in FIG. 1.

Figure 1:
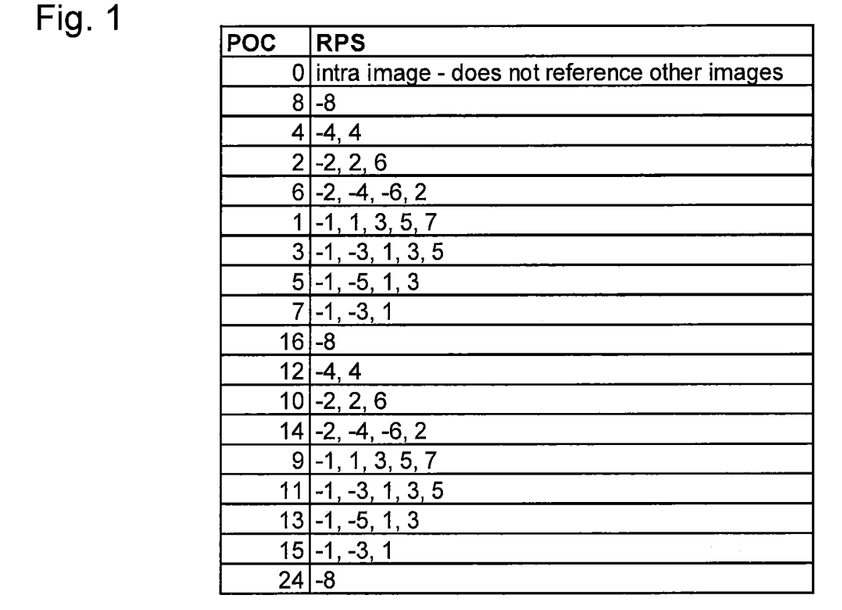
FIG. 1 is an example of RPSs.

As can be seen in FIG. 1, some RPSs are sent several times. For instance, the RPS sent for POC=6 (−2, −4, −6, 2) is the same as for POC=14. Therefore, the standard allows RPSs to be sent in Sequence Parameter Sets (SPSs) in addition to sending RPSs in slice headers. SPSs comprise data which does not need to be sent for every slice. Typically, SPSs are sent only once per sequence, or as often as the possibility of random access is desired. For instance, if the bit stream is broadcasted, it may be sufficient to send the SPS every second, since this would make it possible to switch channel every second. It should be noted that, for it to be possible to switch channel every second, a Clean Random Access (CRA) picture, or an Instantaneous Decoding Refresh (IDR) picture, also needs to be sent every second. A CRA picture is a picture that is not predicted from any previous picture, and no picture which follows the CRA picture in output order predicts from any picture that precedes the CRA picture in output order. An IDR picture is a CRA for which no picture which follows the IDR in decoding order may refer to any picture that precedes the IDR in decoding order.

Figure 2:
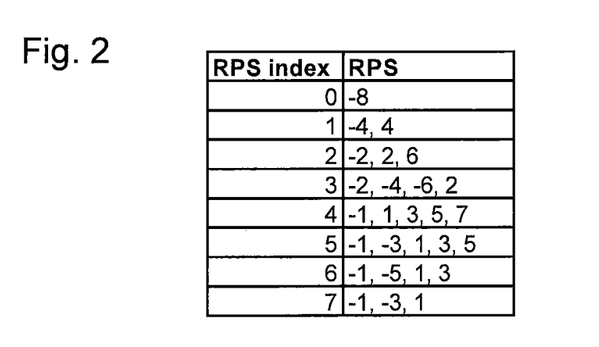
FIG. 2 illustrates coding the example RPSs in an SPS.
Figure 3:
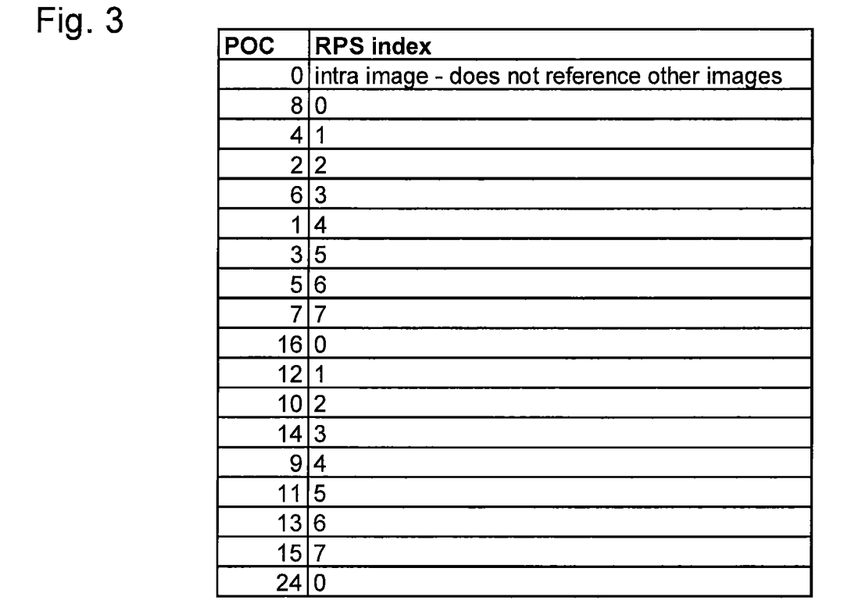
FIG. 3 illustrates coding the example RPSs in a slice header.

In the SPS it is possible to specify the eight recurring RPSs of the example shown in FIG. 1 and assign indices to them, as is shown in FIG. 2. The information sent in the slice header now only has to refer to an RPS index in the SPS, as is illustrated in FIG. 3. Using RPS indices requires fewer bits than sending the RPSs themselves.

To this end, using RPS indices, as is illustrated in FIG. 3, considerably reduces the amount of bits required for sending RPSs since the bulk of the data is sent in the SPS instead, which is sent less frequently. Still, it turns out that it is possible to compress the RPS information even further. By comparing two rows in FIG. 1 one can notice a similarity between them. For instance, every number in the RPS for POC=1 is equal to a corresponding number in the RPS for POC=6 if "5" is added to it. That is the first value "−1" in the RPS for POC=1 is equal to −6+5. The second value "1" is equal to −4+5. The third value "3" is equal to −2+5. The only exception to this rule is the second to last number "5" in the RPS for POC=1. It would need a "0" in the RPS for POC=6, but an image cannot predict from itself.

As it turns out, every RPS in FIG. 1 can be predicted from another RPS. This leads to the following way of describing RPS data in an SPS, e.g., the RPS data in FIG. 1:

For each row, i.e., RPS, it is specified from which other RPS inter-prediction should be made. For instance, predicting from the preceding RPS is indicated by sending the value "−1" in delta_idx_minus1, which is a parameter in the SPS (see short-term RPS syntax FIG. 4).

Figure 4:
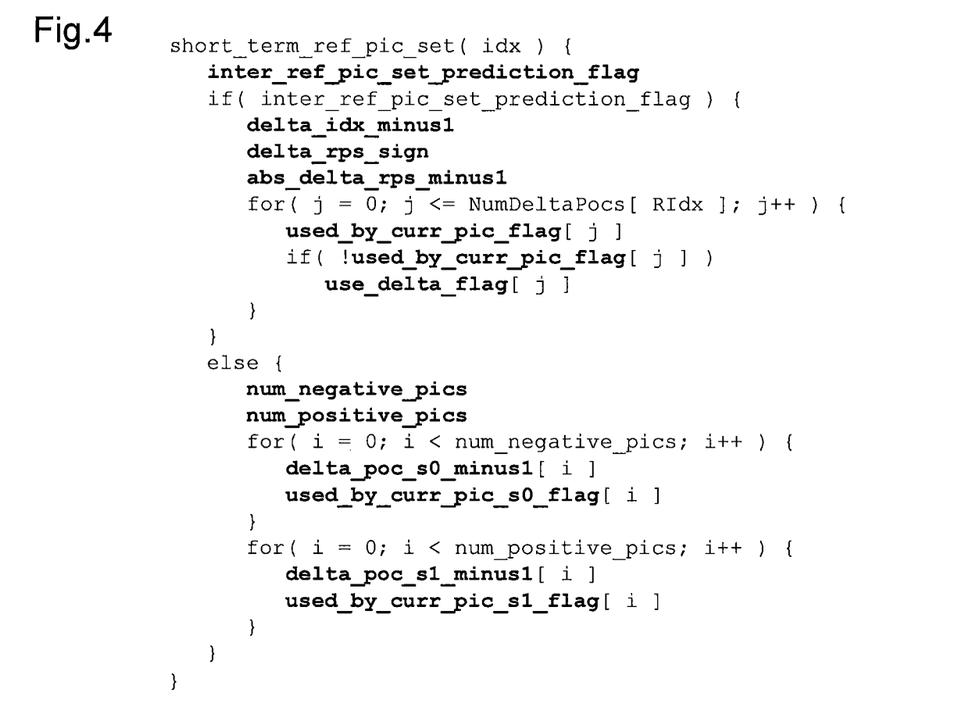
FIG. 4 shows the known syntax of a short-term RPS.

Then, the value to add, "5" in the example, is transmitted using the values delta_rps_sign and abs_delta_rps_minus1, which are parameters in the SPS (see short-term RPS syntax FIG. 4).

By sending RPS information in this way a lot of bits can be saved. The amount of saved bits is about 50% of the bits used for sending RPSs in the SPS, measured for an older version of the configuration files used for testing HEVC reference picture structures. Since SPS data is a very small part of the total video bit stream data, the overall effect is less than 50%, but compressing data efficiently is still important.

Typically, an RPS is sent once, in an SPS, and subsequent slices simply indicate which RPS should be used, by using an RPS index. In some situations, however, the encoder may want to use an RPS which is not in the SPS. The encoder has then the option of sending the RPS explicitly, i.e., in a slice, as is described above. Whether inter-prediction is used or the RPS is encoded value-by-value is signaled for each RPS using the parameter inter_ref_pic_set_prediction_flag, which is part of the short-term RPS shown in FIG. 4. If inter_ref_pic_set_prediction_flag is equal to zero, then the value-by-value method of transmitting RPSs is used, otherwise inter-prediction is used for signaling RPSs.

SUMMARY

It is an object of the invention to provide an improved alternative to the above techniques and prior art.

More specifically, it is an object of the invention to provide an improved way of signaling RPSs.

These and other objects of the invention are achieved by means of different aspects of the invention, as defined by the independent claims. Embodiments of the invention are characterized by the dependent claims.

According to a first aspect of the invention, a method of encoding a video sequence is provided. The video sequence comprises RPSs, in particular short-term RPSs. The method comprises arranging the RPSs in transmission order in a data structure, determining whether explicit RPS transmission is used for an RPS of a current picture of the video sequence, and encoding information indicating an RPS comprised in the data structure to be used for predicting the RPS of the current picture only if explicit RPS transmission is used.

According to a second aspect of the invention, a computer program is provided. The computer program comprises computer program code. The computer program code is adapted, if executed on a processor, to implement the method according to the first aspect of the invention.

According to a third aspect of the invention, a computer program product is provided. The computer program product comprises a computer readable storage medium. The computer readable storage medium has the computer program according to the second aspect of the invention embodied therein.

According to a fourth aspect of the invention, a method of decoding a video sequence is provided. The video sequence comprises RPSs, in particular short-term RPSs. The method comprises receiving a data structure comprising the RPSs arranged in transmission order, determining whether explicit RPS transmission is used for an RPS of a current picture of the video sequence, and receiving information indicating an RPS comprised in the data structure to be used for predicting the RPS of the current picture only if explicit RPS transmission is used.

According to a fifth aspect of the invention, a computer program is provided. The computer program comprises computer program code. The computer program code is adapted, if executed on a processor, to implement the method according to the fourth aspect of the invention.

According to a sixth aspect of the invention, a computer program product is provided. The computer program product comprises a computer readable storage medium. The computer readable storage medium has the computer program according to the fifth aspect of the invention embodied therein.

According to a seventh aspect of the invention, an encoder for encoding a video sequence is provided. The video sequence comprises RPSs, in particular short-term RPSs. The encoder comprises a processor and a memory. The memory comprises instructions executable by the processor, whereby the encoder is operative to arrange the RPSs in transmission order in a data structure, determine whether explicit RPS transmission is used for an RPS of a current picture of the video sequence, and encode information indicating an RPS comprised in the data structure to be used for predicting the RPS of the current picture only if explicit RPS transmission is used.

According to an eighth aspect of the invention, a decoder for decoding a video sequence is provided. The video sequence comprises RPSs, in particular short-term RPSs. The decoder comprises a processor and a memory. The memory comprises instructions executable by the processor, whereby the decoder is operative to receive a data structure comprising the RPSs arranged in transmission order, determine whether explicit RPS transmission is used for an RPS of a current picture of the video sequence, and receive information indicating an RPS comprised in the data structure to be used for predicting the RPS of the current picture only if explicit RPS transmission is used.

The invention makes use of an understanding that coding and signaling of RPSs, in particular short-term RPSs, can be performed more efficiently by using inter-prediction of RPSs. To this end, the RPSs are arranged in transmission order in a data structure, such an SPS. Only if explicit transmission is used for an RPS of a current picture, information indicating which of the RPSs comprised in the data structure is used for predicting the RPS of the current picture is signaled from the encoder to the decoder by encoding such information. In other words, the information which describes which RPS of the RPSs arranged in transmission order should be used for prediction is only signaled if it is required for decoding the video sequence. The information may be encoded into an RPS, in particular a short-term RPS, of the current picture. Embodiments of the invention are advantageous in that the RPS of the current picture can be predicted from RPSs signaled in an SPS, thereby reducing the number of bits required for signaling RPSs and, consequently, the bitrate of the encoded video sequence. In addition, the proposed way of encoding and signaling RPSs is less complex than what is known in the art.

Throughout this disclosure, it is to be understood that information, such as information elements, parameters, values, and the like, which is encoded and signaled, or transmitted, from an encoder to a decoder over a communications network. Such information is consequently received at the decoder and may decoded and subsequently be used in the decoding process.

According to an embodiment of the invention, the method further comprises determining whether inter-prediction is used for the RPS of the current picture, and wherein the information indicating an RPS comprised in the data structure to be used for predicting the RPS of the current picture is only encoded if explicit RPS transmission and inter-prediction are used. That is, information specifying which RPS comprised in the data structure is used for inter-prediction is signaled to the decoder only if inter-prediction is used for an explicitly transmitted RPS. In the event that en explicitly transmitted RPS is encoded value-by-value, i.e., not using inter-prediction, that information is not encoded and signaled. Whether or not inter-prediction is used may, e.g., be signaled from the encoder to the decoder by means of a parameter. This is advantageous in that all alternatives for signaling RPSs are taken into consideration, and the number of bits required for signaling RPSs is reduced.

According to an embodiment of the invention, the encoding the data structure comprises predicting at least one RPS from an RPS which is directly preceding the at least one RPS in transmission order. In particular, this applies if explicit RPS transmission is not used. Predicting an RPS comprised in the data structure from another RPS comprised in the data structure, such as an RPS preceding the RPS in transmission order, is advantageous in that the number of bits required for signaling RPSs is reduced. It will be appreciated that inter-prediction cannot be used for the first RPS in transmission order. As an alternative to using inter-prediction, RPSs may be encoded value-by-value.

According to an embodiment of the invention, the method further comprises assigning an index to each RPS comprised in the data structure, and wherein the information indicating an RPS to be used for predicting the RPS of the current picture specifies the difference between an index of the RPS of the current picture and an index of the RPS used for prediction. This way of coding the information indicating which RPS to use for inter-prediction is advantageous in that the number of bits required for conveying that information is reduced, in particular if Variable Length Coding (VLC) is employed. For instance, the information may be encoded using the HEVC parameter delta_idx_minus1 which is part of the short-term RPS syntax shown in FIG. 4.

According to an embodiment of the invention, the data structure is an SPS.

According to an embodiment of the invention, the determining whether explicit RPS transmission is used comprises determining whether an index of the RPS of the current picture is equal to a number of RPSs comprised in the SPS. This is an efficient way of determining whether explicit RPS transmission is used, since the number of RPSs, in particular short-term RPSs, comprised in the SPS is signaled in the SPS and therefore known at both encoder and decoder.

According to an embodiment of the invention, the determining whether explicit RPS transmission is used comprises determining whether the RPS of the current picture is encoded in a slice header of the current picture. This is an alternative way of determining whether explicit RPS transmission is used. To this end, the slice header is inspected to check whether en RPS is encoded into the slice header.

Even though advantages of the invention have in some cases been described with reference to embodiments of the first or fourth aspects of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

The proposed way of signaling RPSs is based on arranging the RPSs into a data structure, such as an SPS, in transmission order. Different types of transmission order exits, in particular strict transmission order, Group Of Picture (GOP)-wise transmission order, and general transmission order. In the following, strict transmission order is described with reference to FIG. 5, which shows a sequence of 16 pictures.

Figure 5:
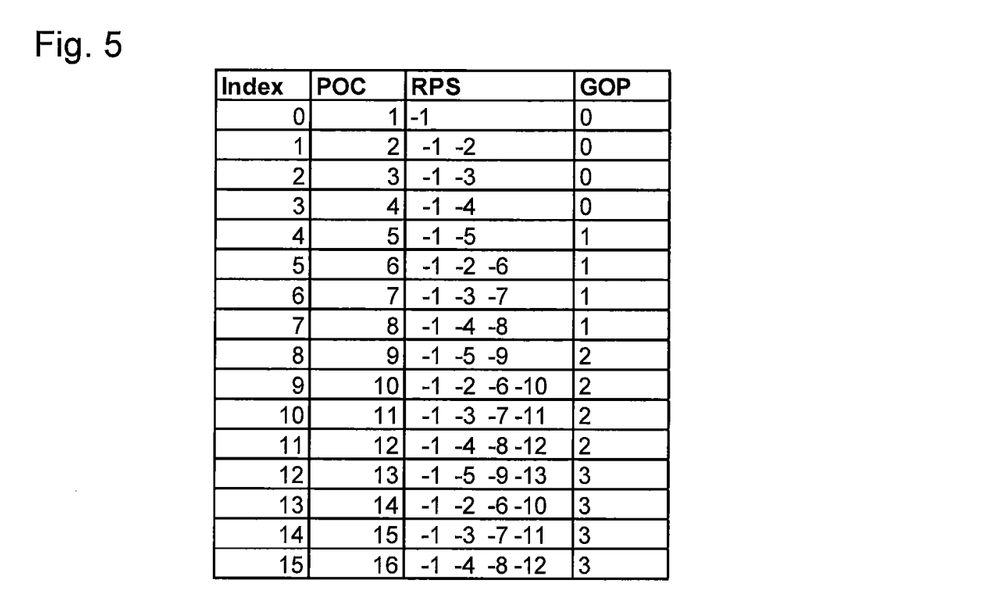
FIG. 5 shows an example sequence of pictures in strict transmission order, in accordance with an embodiment of the invention.

In strict transmission order, the RPSs are encoded in exactly the same order as they are be used, i.e., in the order shown in FIG. 5, which is the order in which the images are decoded, i.e., decoding order, until there are no more RPSs to send (the picture with POC=17 will reuse the RPS in row 12, POC=18 will reuse the RPS in row 13, POC=19 will reuse the RPS in row 14, POC=20 will reuse the RPS in row 15, POC=21 will reuse the RPS in row 12, and so forth). In this case we are guaranteed that the prediction from the preceding row, i.e., RPS, will work.

Figure 6:
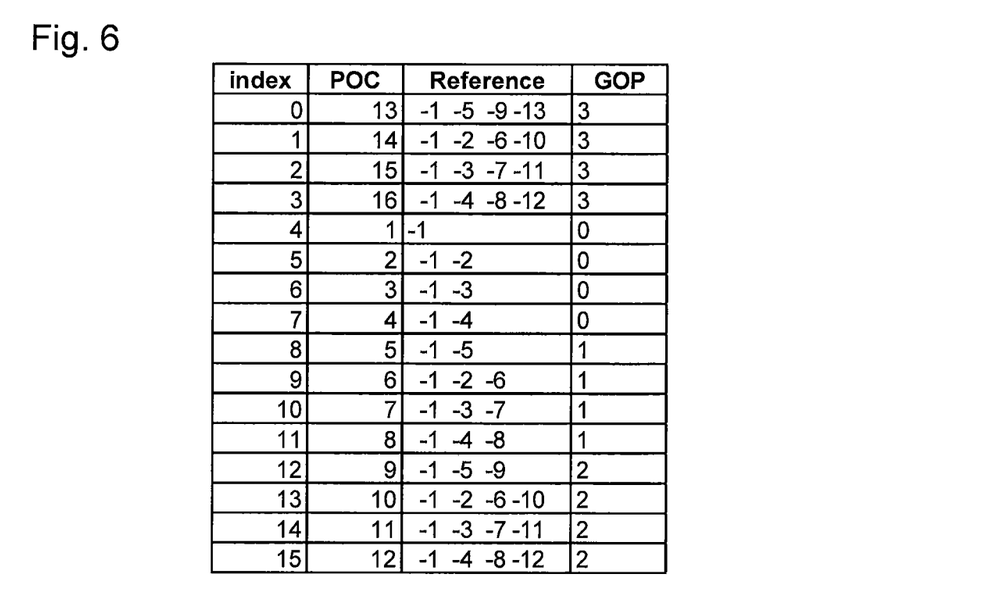
FIG. 6 shows the example sequence of pictures in less strict transmission order, in accordance with an embodiment of the invention.

However, this is a sufficient, but not a necessary condition. There are other, less strict, transmission orders which also allow prediction from the preceding RPS row. One way is to permute the GOPs. Since the pictures available for prediction are mainly determined by the position within a GOP, it is sometimes possible to predict the first RPS of a certain GOP from the last RPS of a preceding GOP. For instance, the order illustrated in FIG. 6 would be possible. In FIG. 6, the second GOP group in the SPS has a lower GOP number than the preceding (first) GOP group, and the row with index 4 (GOP=0) can therefore predict from the row with index 3.

An alternative definition of transmission in transmission order is the following: An RPS A is said to be transmitted in transmission order relative an RPS B if RPS B is transmitted next after A and there exist a picture X that uses RPS A and a picture Y that uses RPS B, and picture Y is the picture that follows picture X in decoding order.

A similar definition, but of storage in transmission order is the following: An RPS A is said to be stored in transmission order relative an RPS B if the index of RPS B is equal to the index of RPS A plus one, and there exists a picture X that uses RPS A and a picture Y that uses RPS B, and picture Y is the picture that follows picture X in decoding order.

Further, the process of encoding and signaling RPSs is dependent on if the RPS is sent explicitly or implicitly. If the RPSs are sent once per sequence or once per second in a data structure such as an SPS, then each slice, which in most cases refers to a frame, can refer to an RPS row, i.e., an RPS index, in the SPS. This is referred to as implicit RPS transmission.

An alternative is to transmit the RPSs directly in the slice header. This is referred to as explicit RPS transmission and can be used in situations when the decoder cannot use an RPS in the SPS, or, wants to use an RPS which is not comprised in the active SPS.

As is described hereinbefore, there are two alternatives for encoding an RPS if explicit RPS transmission is used, encoding using inter-prediction or the value-by-value approach. If inter-prediction is used, it is important to specify which RPS, or row in the list of RPSs in the data structure, to predict from. Since the encoder can choose to explicitly encode the RPS for any frame, the decoder cannot know which row is more likely. Therefore, if inter-prediction is used for explicit RPS transmission, information identifying the one of the RPS comprised in the data structure, i.e., the SPS, is required. That information may be signaled in the parameter delta_idx_minus1.

However, a non-obvious observation is that this is not the case for encoding RPSs in an SPS. Under the condition that RPSs are sent in transmission order, for each RPS, apart from the first RPS in the SPS, an RPS directly preceding the RPS must include all images which can be used for the RPS, except for the previous frame itself. Consequently, when encoding RPSs in an SPS, the variable delta_idx_minus1 is equal to zero and does not need to be transmitted.

Figure 7:
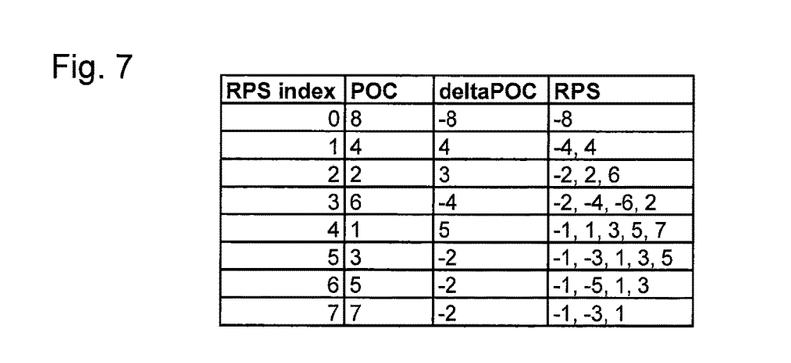
FIG. 7 illustrates coding the example RPSs in an SPS in transmission order, in accordance with an embodiment of the invention.

To elucidate this observation further, the RPSs of FIG. 2 are again shown in FIG. 7, albeit with the POC numbers written out, as well as the delta POC, i.e., the difference between the previous and the current POC number.

With reference to FIG. 7, the encoder would first have to send the first picture with POC=0, an intra-picture which cannot predict from any previous picture. The second picture, i.e., the first row in FIG. 7, would have POC=8 and deltaPOC=0−8=−8. Since there is no other picture transmitted than POC=0, the only picture that POC=8 can refer to is POC=0. Hence, −8 is the only possible value in the RPS.

Now, considering the second transmitted picture with POC=4. The only two pictures which are available are the previous image POC=8, represented by deltaPOC=4, and the first image with POC=0. If it is not the previous picture, it must be available in the preceding RPS, otherwise the decoder would have discarded it. The second picture must therefore have a POC value which is derivable from the preceding RPS, which only contained −8. Adding deltaPOC=4 to that value yields −4, which is the second value in the RPS.

Hence, it should be clear that if the RPSs are stored in transmission order, then all the RPSs must either a) be reconstructable, or predictable, from the preceding RPS adding deltaPOC to the values in the preceding RPS, or b) it must be deltaPOC itself.

If this is not the case, i.e., if a value is neither a) nor b), the value is not predictable from any value in the preceding RPS and the decoder has discarded the picture and it cannot be referenced. The only exceptions are the preceding picture, which is not in the preceding RPS since the picture does not predict from itself, and that is exactly b).

Based on this reasoning it should be clear that, if RPSs are arranged and encoded in transmission order in an SPS, the parameter delta_idx_minus1 may be omitted, saving both complexity and bits. However, when transmitting RPSs explicitly, access to any RPS in the SPS is desirable in order to use that RPS for inter-prediction. In this case, the RPS to predict from is signaled using delta_idx_minus1. Therefore, it is proposed to check whether explicit RPS transmission is used in connection with inter-prediction or not. If explicit RPS transmission is used, and inter-prediction is performed, delta_idx_minus1 will be transmitted, otherwise it is omitted.

It is noted that the issue of whether to signal delta_idx_minus1 or not arises only if inter-prediction is utilized, as can be seen from the short-term RPS syntax shown in FIG. 4. The if-statement in row 3, if(inter_ref_pic_set_prediction_flag)

checks whether inter-prediction is used or not. To this end, delta_idx_minus1 is signaled only if the if-statement evaluates true, i.e., only if inter-prediction is used.

Figure 8:
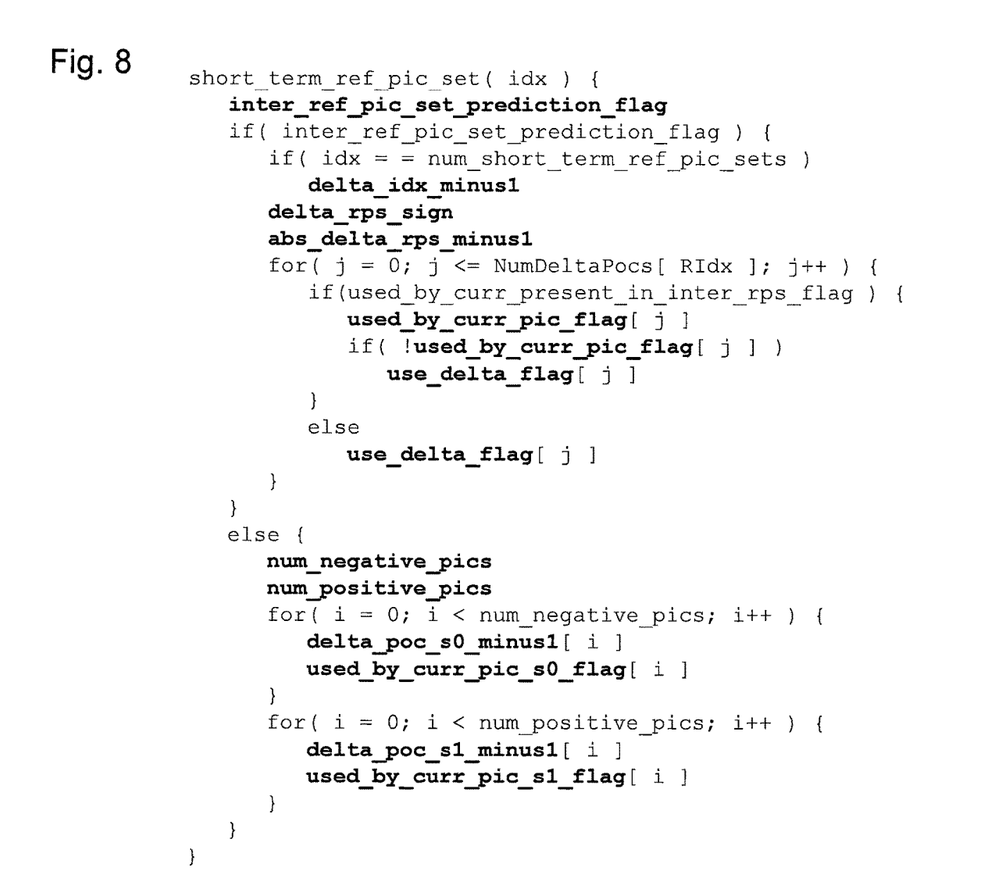
FIG. 8 shows the proposed short-term RPS syntax, in accordance with an embodiment of the invention.

The proposed way of encoding and signaling RPSs, in particular with respect to explicit or implicit transmission, is reflected in the proposed short-term RPS syntax shown in FIG. 8.

In the short-term RPS syntax shown in FIG. 8, a new if-statement is introduced:

if(idx==num_short_term_ref_pic_sets)

If this statement evaluates to "true", explicit RPS transmission is used for the current picture, and the decoder needs to decode delta_idx_minus1. Otherwise, if the statement evaluated to false, the RPS is one of the RPSs signaled in the SPS, and delta_idx_minus1 is inferred to be equal to 0, i.e., inter-prediction from the directly preceding RPS is performed. In correspondence with the known short-term RPS shown in FIG. 4, the issue of whether to signal delta_idx_minus1 or not arises only if inter-prediction is used. This can be seen from the if-statement in row 3 of the proposed short-term RPS shown in FIG. 8, which is identical to the if-statement of the known short-term RPS shown in FIG. 4.

More specifically, processing in accordance with the syntax shown in FIG. 8 is performed both when the SPS is created, e.g., once per sequence or once per second, and, optionally for a slice header of the current picture in the event that the encoder employs explicit RPS transmission. In the first case, the value of idx will vary from 0 to the value of num_short_term_ref_pic_sets−1, i.e., the number of short-term RPSs signaled in the SPS, minus one. In the second case, when explicit RPS transmission is used, the value of idx will be equal to num_short_term_ref_pic_set. Thus, one can determine whether explicit RPS transmission is used by comparing idx to num_short_term_ref_pic_set, as is done by the if-statement.

As an alternative, one may envisage embodiments of the invention which are based on another parameter other parameter which is equal to 0 when called during the SPS creation, i.e., the first case described above, and equal to 1 when called during creation of a slice header. In such case, the corresponding if-statement reads if(other parameter).

As yet a further alternative, one function for creating the short-term RPS may be executed when the SPS is created, and another function when the slice header is created. To this end, the first function would not transmit/receive the parameter delta_idx_minus1, but the second function would transmit/receive the parameter delta_idx_minus1.

At first glance, the proposed short-term RPS syntax shown in FIG. 8 appears to have increased complexity as compared to the current standard shown in FIG. 4, partly due to extra if-statement on row 4. However, it should be noted that decoding the value delta_idx_minus1 is more complex than just evaluating the if-statement. Also, since non-explicit RPS transmission is used for most of the pictures, the additional if-statement is rarely executed.

In order to elucidate the invention even further, an illustrative example of an embodiment of the invention is now described with reference to FIG. 9, which depicts a bit stream 900 comprising an SPS 901 and three slices, "slice 2" 902, "slice 3" 903, and "slice 4" 904. The bit stream 900 may comprise additional elements which are omitted in FIG. 9.

The SPS 901 comprises, among other data, five RPSs 905. An RPS can be transmitted in an SPS by means of value-by-value coding, which in many cases is the most efficient way if the number of values in the RPS is small. For instance, the first RPS in the list of RPSs 905 ({−8}) can be sent value-by-value as:

inter_ref_set_prediction_flag=0
num_negative_pics=1
num_positive_pics=0
delta_poc_s0_minus1[0]=8
used_by_cur_flag[0]=1

As an alternative, an RPS comprises in an SPS can also be transmitted using inter-prediction, e.g., the second RPS in the list of RPSs 905 ({−4, 4}). Since the RPS is signaled in the SPS 901, i.e., not explicitly, no information describing which RPS to predict from needs to be signaled, since inter-prediction is performed from the previous row, which in the present example comprises only a single value {−8}. Hence, the second RPS is transmitted as:

inter_ref_set_prediction_flag=1
delta_rps_sign=0
abs_delta_rps_minus1=3

The decoder will be able to reconstruct the second RPS as follows. First, deltaRps=(1−2*delta_rps_sign)*(abs_delta_rps_minus1+1)=4 is calculated and added to the value {−8} (first RPS), resulting in −4, which is the first value of the second RPS. The second value of the second RPS is the delta_rps-value itself (delta_rps=4). Thus, the second RPS is reconstructed as {−4, 4}. It is emphasized here that delta_idx_minus1 is not transmitted for the second RPS since it is inferred to be equal to zero.

Correspondingly, the remaining RPSs in the list of RPSs 905 in the SPS 901 can be sent either value-by-value or using inter-prediction, as is described hereinbefore. For instance, the third RPS {−2, −4, −6, 2} may be signaled using inter-prediction whereas the fourth RPS {−1, 1, 3, 5, 7} may be signaled value-by-value.

Figure 9:
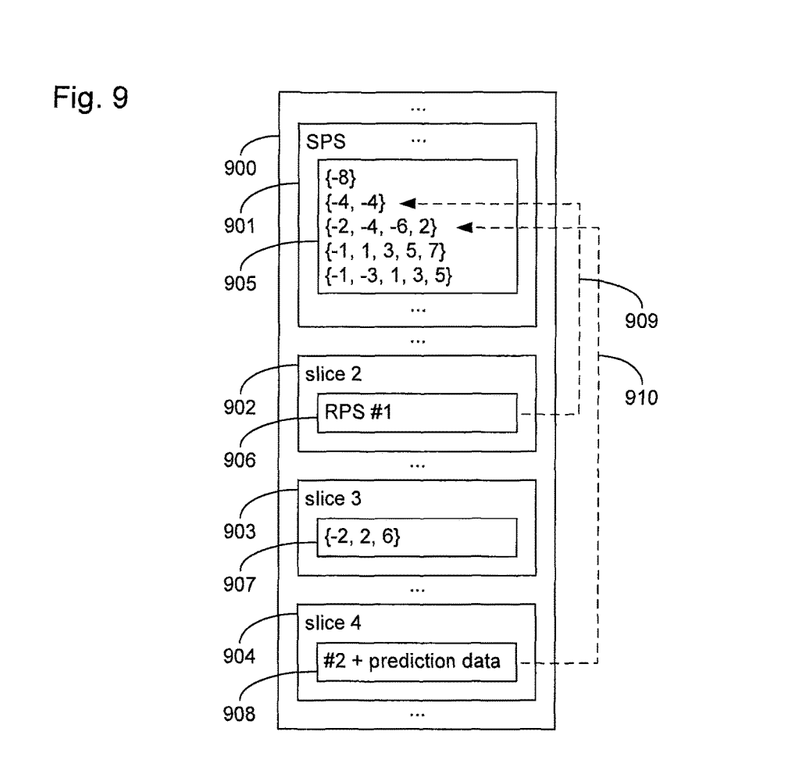
FIG. 9 shows a bitstream, in accordance with an embodiment of the invention.

Further with reference to the bitstream 900 illustrated in FIG. 9, slice 2 902 illustrates implicit transmission of an RPS. To this end, slice 2 902 comprises information indicating 909 which RPS in the list 905 of RPSs to use, such as an RPS index "#1". Thus, for slice 2 902 the encoder transmits:

short_term_ref_pic_set_sps_flag=1 to indicate that an RPS from the list 905 of RPSs in the SPS 901 should be used, and then transmits short_term_ref_pic_set_idx=1 to indicate that the second RPS in the list 905, having index "#1", should be used.

As a further example, it is assumed that slice 3 903, which is transmitted in the bitstream 900, cannot use any RPS from the list 905 of RPSs signaled in the SPS 901, but instead signals an RPS 907 explicitly. There are two ways of signaling explicitly, and in the present example slice 3 903 uses value-by-value coding. Thus, the encoder transmits:

inter_ref_set_prediction_flag=0
num_negative_pics=1
num_positive_pics=2
delta_poc_s0_minus1[0]=1
used_by_cur_flag[0]=1
delta_poc_s1_minus1[0]=1
used_by_cur_flag[0]=1
delta_poc_s1_minus1[1]=3
used_by_cur_flag[1]=1 to signal the RPS 907 ({−2, 2, 6}). The number of negative pics in this set is one (−2), and the number positive ones is two (2 and 6). The negative value is coded relative to the zero (delta_poc_s0[0]=2), and the first positive value is coded likewise. Finally the difference between the two positive values (6−2=4) is encoded (delta_poc_s1[1]=4).

The other way of encoding explicitly is illustrated with reference to slice 4 904 of the bitstream 900. Slice 4 904 uses inter-prediction, but since the RPS it is transmitted explicitly, information 908 indicating 910 from which RPS in the list 905 of RPSs to predict from must be provided. In the present example, this is indicated by RPS index "#2" 908. Thus, the following is transmitted in slice 4 904:

inter_ref_set_prediction_flag=1
delta_idx_minus1=2
num_negative_pics=1
num_positive_pics=0
delta_poc_s0_minus1[0]=8
used_by_cur_flag[0]=1

The decoder can now calculate the RefRpsIdx as $RefRpsIdx=stRpsIdx-(\text{delta\_idx\_minus1}+1)$.

In the present example, the list 905 of RPSs in the SPS 901 comprises five RPSs. Thus, stRpsIdx will be equal to five, and RefRPSIdx is evaluated to 5−(2+1)=2, which is the index of the third RPS ({−2, −4, −6, 2}). In the case of slice 4 904, delta_idx_minus1 must be sent in order to indicate which RPS to predict from. In addition to the RPS index 908, information describing how to predict is signaled ("prediction data" 908).

In the following, the example shown in FIG. 9 is described for a decoder. The decoder first receives the SPS 901 comprising a list 905 of RPSs. The RPSs comprised in list 905 can either be received value-by-value or using inter-prediction. For instance, the first RPS ({-8}) is received value-by-value by receiving
    inter_ref_set_prediction_flag=0
    num_negative_pics=1
    num_positive_pics=0
    delta_poc_s0_minus1[0]=8
    used_by_cur_flag[0]=1

On the other hand, the second RPS ({-4, 4}) may be received using inter-prediction. However, since the RPS is comprised in the SPS 901, the RPS is not received explicitly, and delta_idx_minus1 is therefore not received. Hence, the following is received by the decoder for the second RPS:
    inter_ref_set_prediction_flag=1
    delta_rps_sign=0
    abs_delta_rps_minus1=3

The decoder will be able to reconstruct deltaRps=(1−2*delta_rps_sign)*(abs_delta_rps_minus1+1)=4. deltaRps is then added to the value {-8} (from the first RPS), resulting in −4, which is the first value of the second RPS. The second value of the second RPS is the delta_rps-value itself (4), and the RPS is therefore predicted as {-4, 4}. The other RPSs signaled in the SPS 901 are received value-by-value or using inter-prediction, as is described above.

For slice 2 902, the RPS is received implicitly by receiving an RPS index 906 ("#1") which points 909 to the second RPS in the list 905 of RPSs in the SPS 901. Slice 3 903 transmits its RPS 907 explicitly, coded value-by-value.

The RPS for slice 4 904 is received explicitly using inter-prediction. Therefore, information 908 indicating an RPS in the list 905 of RPSs to be used for inter-prediction (RPS index "#2") is received, in addition to information describing how to predict ("prediction data" 908). In this case, it is necessary to receive delta_idx_minus1, and the following information is received by the decoder:
    inter_ref_set_prediction_flag=1
    delta_idx_minus1=2
    num_negative_pics=1
    num_positive_pics=0
    delta_poc_s0_minus1[0]=8
    used_by_cur_flag[0]=1

It is emphasized here that, in order to receive the RPS of slice 4 904 explicitly, using inter-prediction, it is necessary to receive delta_idx_minus1.

Figure 10:
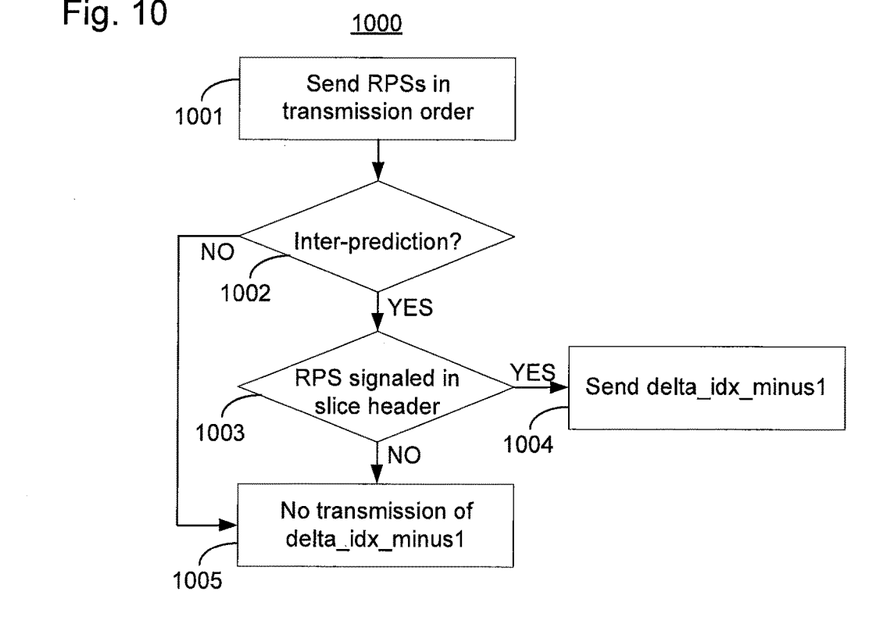
FIG. 10 shows a method of encoding RPSs, in accordance with an embodiment of the invention.

In FIG. 10 an embodiment of the method of encoding a video sequence comprising RPSs is shown. The method 1000 starts with arranging 1001 the RPSs in transmission order in a data structure, such as an SPS, and sending 1001 the data structure. Subsequently, it is determined 1002 whether inter-prediction is used. This may, e.g., be achieved by using inter_ref_set_prediction_flag, as is described hereinbefore and as is known in the art. If inter-prediction is used ("YES" in FIG. 10), it is determined 1002 whether explicit RPS transmission is used for an RPS of a current picture of the video sequence, i.e., whether the RPS is signaled in a slice header of the current picture. If explicit transmission is used, i.e., if the RPS is signaled in a slice header of the current picture, information indicating an RPS comprised in the data structure to be used for predicting the RPS of the current picture, such as delta_idx_minus1, is encoded and sent 1004. The information is only transmitted 1004 if explicit RPS transmission is used, otherwise it is not transmitted 1005. Likewise, if inter-prediction is not used 1002 ("NO" in FIG. 10), information indicating an RPS comprised in the data structure to be used for predicting the RPS of the current picture, such as delta_idx_minus1, is not signaled. It will be appreciated that embodiments of the invention are not limited to the exact order of steps shown in FIG. 10. For instance, embodiments of the invention may be envisaged which first determine whether explicit RPS transmission is used for an RPS of a current picture of the video sequence, i.e., whether the RPS is signaled in a slice header of the current picture, and subsequently determine whether inter-prediction is used.

Figure 11:
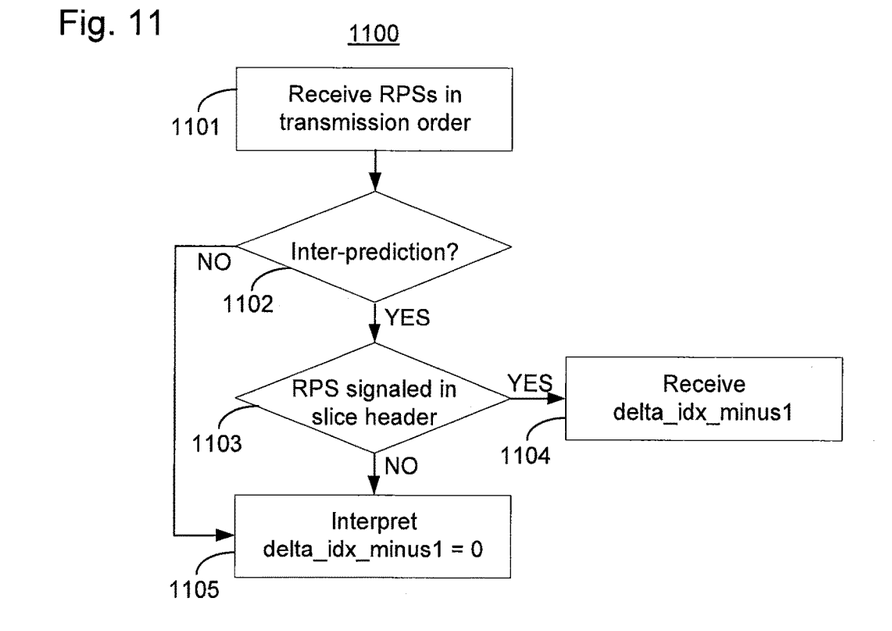
FIG. 11 shows a method of decoding RPSs, in accordance with an embodiment of the invention.

In FIG. 11 an embodiment of the method of decoding a video sequence comprising RPSs is shown. The method 1100 comprises receiving 1101 a data structure comprising the RPSs arranged in transmission order and determining 1102 whether inter-prediction is used. This may, e.g., be achieved by inspecting inter_ref_set_prediction_flag, as is described hereinbefore. If inter-prediction is used ("YES" in FIG. 11), it is determined 1103 whether explicit RPS transmission is used for an RPS of a current picture of the video sequence, i.e., whether the RPS is signaled in a slice header of the current picture. If explicit transmission is used, i.e., if the RPS is signaled in a slice header of the current picture, information indicating an RPS comprised in the data structure to be used for predicting the RPS of the current picture, such as delta_idx_minus1, is received 1104. The information is only received 1104 if explicit RPS transmission is used, otherwise it is not received 1105. If the information is delta_idx_minus1, specifying the difference between an index of the RPS of the current picture and an index of the RPS used for prediction, delta_idx_minus1 is instead interpreted 1105 to be equal to zero, i.e., the preceding RPS is used for inter-prediction. If inter-prediction is not used 1102 ("NO" in FIG. 10), information indicating an RPS comprised in the data structure to be used for predicting the RPS of the current picture, such as delta_idx_minus1, is not received. It will be appreciated that embodiments of the invention are not limited to the exact order of steps shown in FIG. 11. For instance, embodiments of the invention may be envisaged which first determine whether explicit RPS transmission is used for an RPS of a current picture of the video sequence, i.e., whether the RPS is signaled in a slice header of the current picture, and subsequently determine whether inter-prediction is used.

Figure 12:
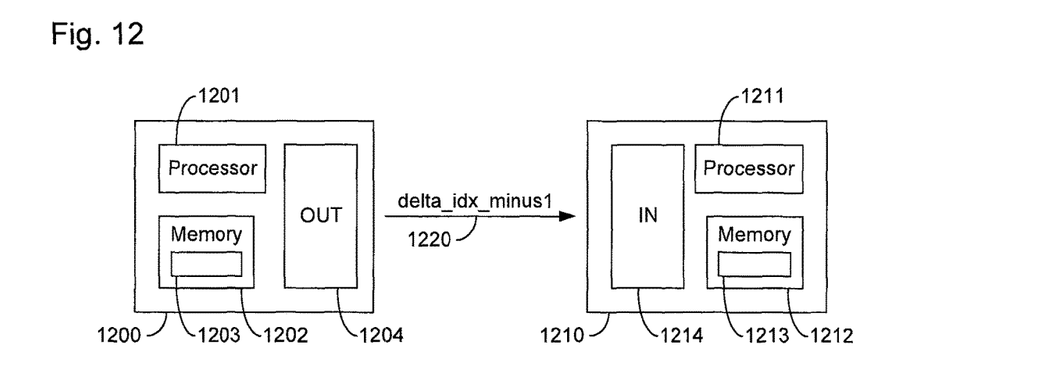
FIG. 12 shows an encoder and a decoder, in accordance with embodiments of the invention.

In FIG. 12 embodiments of an encoder for encoding a video sequence comprising RPSs and embodiments of a decoder for decoding a video sequence comprising RPSs are shown.

The encoder 1200 comprises a processor 1201 and a memory 1202 comprising instructions 1203 executable by the processor 1201, whereby the encoder 1200 is operative to arrange the RPSs in transmission order in a data structure, determine whether explicit RPS transmission is used for an RPS of a current picture of the video sequence, and encode information 1220 indicating an RPS comprised in the data structure to be used for predicting the RPS of the current picture, such as delta_idx_minus1, only if explicit RPS transmission is used.

The decoder 1210 comprises a processor 1211 and a memory 1212 comprising instructions 1213 executable by the processor 1211, whereby the decoder 1210 is operative to receive a data structure comprising the RPSs arranged in transmission order, determine whether explicit RPS transmission is used for an RPS of a current picture of the video sequence, and receive information 1220 indicating an RPS comprised in the data structure to be used for predicting the RPS of the current picture, such as delta_idx_minus1, only if explicit RPS transmission is used.

It should be noted that the embodiments described herein relate to video encoders and decoders, as well as bitstream parsers, transcoders, network nodes, and so forth. Embodiments of the encoder and the decoder can be implemented in devices such as video cameras, displays, tablets, digital television receivers, network nodes, and so forth. Although it is shown in FIG. 12 that the parameter delta_idx_minus1 is sent, it is to be understood that delta_idx_minus1 is only sent only if explicit RPS transmission is used, in accordance with embodiments of the invention.

It will also be appreciated that the use of delta_idx_minus1 throughout this document it is only an example for how to indicate which RPS should be used for inter-prediction, and it should be obvious the reader that other signaling schemes can be used. In this respect, any reference to delta_idx_minus1 should be understood as an indicator of which RPS to predict from.

It should further be noted that, although the embodiments herein describe RPSs to be part of an SPS, RPSs may also be included in other data structures, e.g., PPSs or any other parameter set.

As an alternative to the encoder 1200 described with reference to FIG. 12, an embodiment of the encoder may also comprise means being configured for arranging the RPSs in transmission order in a data structure, determining whether explicit RPS transmission is used for an RPS of a current picture of the video sequence, and encoding information indicating an RPS comprised in the data structure to be used for predicting the RPS of the current picture, such as delta_idx_minus1, only if explicit RPS transmission is used.

As yet a further alternative, an embodiment of the encoder may also comprise means for arranging the RPSs in transmission order in a data structure, means for determining whether explicit RPS transmission is used for an RPS of a current picture of the video sequence, and means for encoding information indicating an RPS comprised in the data structure to be used for predicting the RPS of the current picture, such as delta_idx_minus1, only if explicit RPS transmission is used.

As an alternative to the decoder 1210 described with reference to FIG. 12, an embodiment of the decoder may also comprise means being configured for receiving a data structure comprising the RPSs arranged in transmission order, determining whether explicit RPS transmission is used for an RPS of a current picture of the video sequence, and receiving information indicating an RPS comprised in the data structure to be used for predicting the RPS of the current picture, such as delta_idx_minus1, only if explicit RPS transmission is used.

As yet a further alternative, an embodiment of the decoder may also comprise means for receiving a data structure comprising the RPSs arranged in transmission order, means for determining whether explicit RPS transmission is used for an RPS of a current picture of the video sequence, and means for receiving information indicating an RPS comprised in the data structure to be used for predicting the RPS of the current picture, such as delta_idx_minus1, only if explicit RPS transmission is used.

The person skilled in the art realizes that the invention by no means is limited to the embodiments described above. On the contrary, many modifications and variations are possible within the scope of the appended claims.

The invention claimed is:

1. A method of encoding Reference Picture Sets, RPSs, in a High Efficiency Video Coding, HEVC, video sequence, the method comprising:
    determining whether a current RPS is sent explicitly, in a slice header of a current picture, or implicitly, in a Sequence Parameter Set, SPS,
    if the current RPS is sent implicitly:
        arranging the current RPS in decoding order in the SPS, and
        determining whether RP S inter-prediction is used for the current RPS; and
        if RPS inter-prediction is used for the current RPS, inferring that the current RPS is inter-predicted from an RPS comprised in the SPS and directly preceding the current RPS in decoding order; and
    if the current RPS is sent explicitly, and if RPS inter-prediction is used for the current RPS, encoding information indicating an RPS comprised in the SPS to be used for inter-predicting the current RPS.

2. The method according to claim 1, wherein at least one RPS of the RPSs arranged in the SPS is inter-predicted from an RPS which is directly preceding the at least one RPS in decoding order.

3. The method according to claim 1, wherein the current RPS is sent explicitly if an index of the current RPS is equal to a number of RPSs comprised in the SPS.

4. The method according to claim 1, further comprising assigning an index to each RPS comprised in the SPS, the index ranging from 0 to a number of RPSs comprised in the SPS minus one, wherein the information indicating an RPS comprised in the SPS to be used for inter-predicting the current RPS specifies the difference between an index of the current RPS and an index of the RPS used for inter-prediction.

5. A method of decoding a High Efficiency Video Coding, HEVC, video sequence comprising Reference Picture Sets, RPSs, the method comprising:
    determining whether a current RPS is sent explicitly, in a slice header of a current picture, or implicitly, arranged in decoding order in a Sequence Parameter Set, SPS;
    determining whether RPS inter-prediction is used for the current RPS;
    if the current RPS is sent implicitly, and if RPS inter-prediction is used, inferring that the current RPS is inter-predicted from an RPS comprised in the SPS and directly preceding the current RPS in decoding order; and
    if the current RPS is sent explicitly, and if RPS inter-prediction is used, receiving information indicating an RPS comprised in the SPS to be used for inter-predicting the current RPS.

6. The method according to claim 5, wherein at least one RPS of the RPSs arranged in the SPS is inter-predicted from an RPS which is directly preceding the at least one RPS in decoding order.

7. The method according to claim 5, wherein the current RPS is sent explicitly if an index of the current RPS is equal to a number of RPSs comprised in the SPS.

8. The method according to claim 5, further comprising assigning an index to each RPS comprised in the SPS, the index ranging from 0 to a number of RPSs comprised in the SPS minus one, wherein the information indicating an RPS comprised in the SPS to be used for inter-predicting the current RPS specifies the difference between an index of the current RPS and an index of the RPS used for inter-prediction.

9. A computer program comprising computer program code, the computer program code being adapted, if executed on a processor, to implement the method according to claim 1.

10. A computer program product comprising a computer readable storage medium, the computer readable storage medium having the computer program according to claim 9 embodied therein.

11. An encoder for encoding Reference Picture Sets, RPSs, in a High Efficiency Video Coding, HEVC, video sequence, the encoder comprising a processor and a memory comprising instructions that when executed by the processor causes the processor to perform operations comprising:
- determining whether a current RPS is sent explicitly, in a slice header of a current picture, or implicitly, in a Sequence Parameter Set, SPS,
- if the current RPS is sent implicitly:
- arranging the current RPS in decoding order in the SPS, and
- determining whether RPS inter-prediction is used for the current RPS; and
- if RPS inter-prediction is used for the current RPS, inferring that the current RPS is inter-predicted from an RPS comprised in the SPS and directly preceding the current RPS in decoding order; and
- if the current RPS is sent explicitly, and if RPS inter-prediction is used for the current RPS, encoding information indicating an RPS comprised in the SPS to be used for inter-predicting the current RPS.

12. The encoder according to claim 11, wherein at least one RPS of the RPSs arranged in the SPS is inter-predicted from an RPS which is directly preceding the at least one RPS in decoding order.

13. The encoder according to claim 11, wherein the current RPS is sent explicitly if an index of the current RPS is equal to a number of RPSs comprised in the SPS.

14. The encoder according to claim 11, being further operative to assign an index to each RPS comprised in the SPS, the index ranging from 0 to a number of RPSs comprised in the SPS minus one, wherein the information indicating an RPS comprised in the SPS to be used for inter-predicting the current RPS specifies the difference between an index of the current RPS and an index of the RPS used for inter-prediction.

15. A decoder for decoding a High Efficiency Video Coding, HEVC, video sequence comprising Reference Picture Sets, RPSs, the decoder comprising a processor and a memory comprising instructions executable by the processor that when executed by the processor causes the processor to perform operations comprising:
- determining whether a current RPS is sent explicitly, in a slice header of a current picture, or implicitly, arranged in decoding order in a Sequence Parameter Set, SPS;
- determining whether RPS inter-prediction is used for the current RPS;
- if the current RPS is sent implicitly, and if RPS inter-prediction is used, inferring that the current RPS is inter-predicted from an RPS comprised in the SPS and directly preceding the current RPS in decoding order; and
- if the current RPS is sent explicitly, and if RPS inter-prediction is used, receiving information indicating an RPS comprised in the SPS to be used for inter-predicting the current RPS.

16. The decoder according to claim 15, wherein at least one RPS of the RPSs arranged in the SPS is inter-predicted from an RPS which is directly preceding the at least one RPS in decoding order.

17. The decoder according to claim 15, wherein the current RPS is sent explicitly if an index of the current RPS is equal to a number of RPSs comprised in the SPS.

18. The decoder according to claim 15, being further operative to assign an index to each RPS comprised in the SPS, the index ranging from 0 to a number of RPSs comprised in the SPS minus one, wherein the information indicating an RPS comprised in the SPS to be used for inter-predicting the current RPS specifies the difference between an index of the current RPS and an index of the RPS used for inter-prediction.

* * * * *

UNITED STATES PATENT AND TRADEMARK OFFICE
CERTIFICATE OF CORRECTION

PATENT NO. : 9,769,495 B2
APPLICATION NO. : 15/220512
DATED : September 19, 2017
INVENTOR(S) : Ström et al.

It is certified that error appears in the above-identified patent and that said Letters Patent is hereby corrected as shown below:

In the Drawings

In Fig. 9, Sheet 5 of 6, delete "{-4, -4}" and insert -- {-4, 4} --, therefor.

In the Specification

In Column 1, Line 9, delete "2013," and insert -- 2013, now Pat. No. 9,438,900, --, therefor.

In Column 5, Lines 10-11, delete "en explicitly" and insert -- an explicitly --, therefor.

In Column 5, Line 59, delete "en RPS" and insert -- an RPS --, therefor.

In Column 9, Lines 10-11, delete "other parameter" and insert -- other_parameter --, therefor.

In Column 9, Line 15, delete "if(other parameter)." and insert -- if(other_parameter). --, therefor.

In Column 10, Line 58, delete "RefRPSIdx" and insert -- RefRpsIdx --, therefor.

In the Claims

In Column 14, Line 4, in Claim 1, delete "RP S" and insert -- RPS --, therefor.

In Column 15, Line 6, In Claim 11, delete "RP S" and insert -- RPS --, therefor.

In Column 16, Line 12, in Claim 15, delete "RP S" and insert -- RPS --, therefor.

In Column 16, Line 30, in Claim 18, delete "0to" and insert -- 0 to --, therefor.

Signed and Sealed this
Fifth Day of December, 2017

Joseph Matal
*Performing the Functions and Duties of the
Under Secretary of Commerce for Intellectual Property and
Director of the United States Patent and Trademark Office*